United States Patent
Gurevitz et al.

(10) Patent No.: US 12,381,652 B2
(45) Date of Patent: Aug. 5, 2025

(54) WIRELESS COMMUNICATION DEVICE AND APPARATUS, DEVICE, METHOD AND COMPUTER PROGRAM FOR A WIRELESS COMMUNICATION DEVICE

(71) Applicant: Intel Corporation, Santa Clara, CA (US)

(72) Inventors: Assaf Gurevitz, Ramat Hasharon (IL); Avishay Friedman, Petach Tikva (IL); Shlomi Vituri, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 688 days.

(21) Appl. No.: 17/455,926

(22) Filed: Nov. 22, 2021

(65) Prior Publication Data

US 2022/0200730 A1  Jun. 23, 2022

(30) Foreign Application Priority Data

Dec. 23, 2020 (EP) .................................. 20216814

(51) Int. Cl.
| | | |
|---|---|---|
| *H04L 1/00* | (2006.01) | |
| *H04L 1/20* | (2006.01) | |
| *H04W 4/80* | (2018.01) | |
| *H04W 24/10* | (2009.01) | |

(52) U.S. Cl.
CPC .......... *H04L 1/0061* (2013.01); *H04L 1/0057* (2013.01); *H04L 1/203* (2013.01); *H04W 24/10* (2013.01); *H04W 4/80* (2018.02)

(58) Field of Classification Search
CPC ..... H04L 1/0061; H04L 1/0057; H04L 1/203; H04L 1/0045; H04L 1/201; H04L 25/024; H04L 25/0262; H04W 24/10; H04W 4/80; H04W 24/00; H04B 17/309
See application file for complete search history.

(56) References Cited

U.S. PATENT DOCUMENTS

| | | | | |
|---|---|---|---|---|
| 2005/0207383 | A1* | 9/2005 | Carsello | H04L 12/56 370/335 |
| 2009/0135972 | A1* | 5/2009 | Tanaka | H04B 1/1027 375/346 |
| 2014/0199991 | A1* | 7/2014 | Mukherjee | H03M 13/612 455/422.1 |
| 2017/0094527 | A1* | 3/2017 | Shattil | H04K 3/92 |
| 2017/0238328 | A1* | 8/2017 | Luong | H04W 4/80 370/329 |
| 2020/0322070 | A1 | 10/2020 | Zhang et al. | |
| 2020/0358700 | A1* | 11/2020 | Ryan | H04W 4/80 |

OTHER PUBLICATIONS

Hamming distance, Wikipedia (Dec. 7, 2020, 12:26 AM), https://en.wikipedia.org/w/index.php?title=Hamming_distance&oldid=994684345.

* cited by examiner

*Primary Examiner* — Chandrahas B Patel
*Assistant Examiner* — David M Kayal
(74) *Attorney, Agent, or Firm* — SPL Patent Attorneys PartG mbB; Yong Beom Hwang

(57) ABSTRACT

Various examples of the present disclosure relate to a wireless communication device and to an apparatus, a device, a method and a computer program for a wireless communication device. The apparatus comprises interface circuitry for obtaining information on a signal received by the wireless communication device. The apparatus comprises processing circuitry configured to determine a presence of a wireless identifier of the wireless communication device within the signal using at least one probabilistic detector.

18 Claims, 3 Drawing Sheets

WIRELESS COMMUNICATION DEVICE AND APPARATUS, DEVICE, METHOD AND COMPUTER PROGRAM FOR A WIRELESS COMMUNICATION DEVICE

CROSS-REFERENCE TO RELATED APPLICATION

This application claims priority to European Application 20216814.2, filed on Dec. 23, 2020. The content of this earlier filed application is incorporated by reference herein in its entirety.

FIELD

Various examples of the present disclosure relate to a wireless communication device and to an apparatus, a device, a method and a computer program for a wireless communication device.

BACKGROUND

Bluetooth Low Energy (BLE) packet detectors may be tested, in general, in two main cases. The first one is in the sensitivity point of BER=$10^{-3}$ (Bit-Error Rate), which means that, in general, a good detector might not limit the performance, i.e. the MD (Miss Detection) rate may be negligible. In addition, BLE detectors may be tested in BQB (Bluetooth Qualification Body) tests, which are required to pass in order to get BT certification. One of the BQB tests in BLE is to reject BLE packets which have a Hamming distance of only one bit between their Access Address Code (AAC) to the AAC of the tested BT device.

Some detectors, which are based on non-coherent demodulation of the AAC bits, might pass the mentioned BQB test by defining the detection threshold to its maximal value. Some detectors for BT packets are based on non-coherent demodulation of the AAC bits or non-coherent cross correlation between the GFSK (Gaussian Frequency Shift Keying) modulated waveform of the ACC bits to the received packet. Such detectors may require setting of their thresholds to its maximal value in order to pass some BQB tests, such as the test related to rejecting AACs with Hamming distance of one bit relative to the "golden" AAC. This may cause degradation in performance in the sensitivity point, restricting the ability to optimize the threshold value in the sensitivity point. Therefore, the PER (Packet Error Rate) may be limited by the detection performance due to a high MD rate.

BRIEF DESCRIPTION OF THE FIGURES

Some examples of apparatuses and/or methods will be described in the following by way of example only, and with reference to the accompanying figures, in which.

DETAILED DESCRIPTION

Figure 1A:
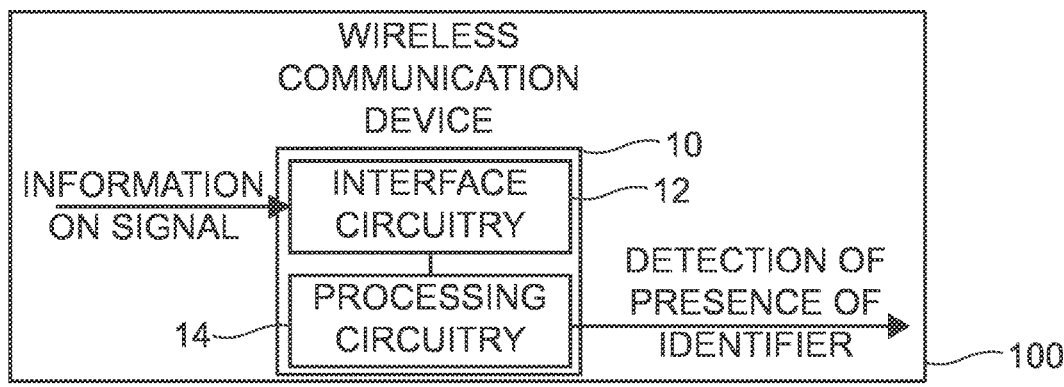
FIG. 1a shows a block diagram of an example of an apparatus or device for a wireless communication device and of a wireless communication device comprising such an apparatus or device.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof Various examples of the present disclosure relate to a probabilistic detector approach for Bluetooth Low Energy (BLE) packets.

FIG. 1a shows a block diagram of an example of an apparatus 10 or device 10 for a wireless communication device 100 and of a wireless communication device comprising such an apparatus or device. The apparatus 10 comprises interface circuitry 12 for obtaining information on a signal received by the wireless communication device. The apparatus 10 comprises processing circuitry 14 configured to determine a presence of a wireless identifier of the wireless communication device within the signal using at least one probabilistic detector. The interface circuitry 12 is coupled to the processing circuitry 14 or integrated with the processing circuitry.

The components of the device 10 are defined as component means, which correspond to the respective structural components of the apparatus 10. For example, the device 10 comprises means for communicating 12, which may be implemented by the processing circuitry 12 of the apparatus 10. Likewise, the device 10 comprises means for processing 14, which may be implemented by the processing circuitry 14 of the apparatus 10.

Figure 1B:
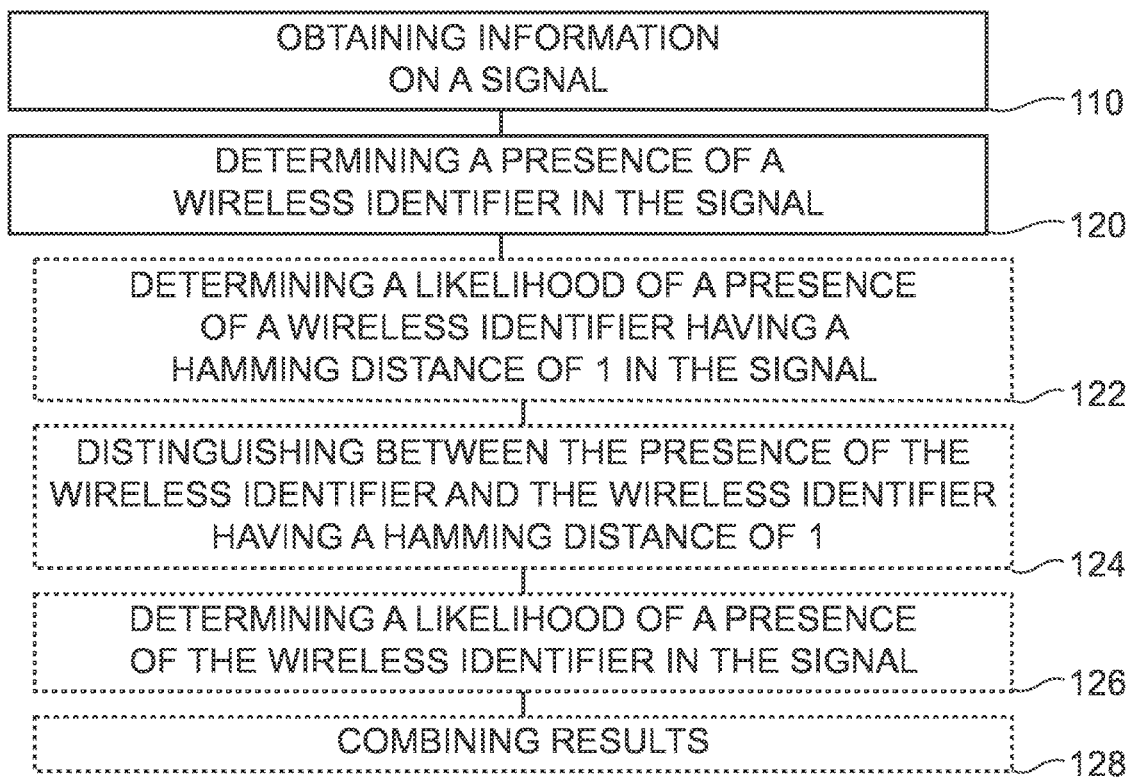
FIG. 1b shows a flow chart of a method for a wireless communication device.

FIG. 1b shows a flow chart of a corresponding method for the wireless communication device 100. The method comprises obtaining 110 information on a signal received by the wireless communication device. The method comprises determining 120 a presence of a wireless identifier of the wireless communication device within the signal using at least one probabilistic detector.

The following description relates to the wireless communication device, to the apparatus and device for the wireless communication device, to the method for the wireless communication device, and to a corresponding computer program. Features introduced in connection with the wireless communication device and/or with the apparatus/device for the wireless communication device may likewise be applied to the corresponding method and computer program for the wireless communication device. For example, the apparatus or device may be a packet detector, e.g. a Bluetooth packet detector. Consequently, the method and computer program may be a method or computer program for detecting packets, e.g. for detecting Bluetooth packets.

Various examples of the present disclosure relate to a wireless communication device and to an apparatus, a device, a method and a computer program for a wireless communication device. In general, a wireless communication device is a device that is capable of performing wireless communication. In particular, within the present disclosure, the focus is on wireless communication according to the Bluetooth™ and/or Bluetooth™ Low Energy wireless communication standard. However, the same principle can also be applied to other wireless communication standards that rely on detecting packets from other wireless communication devices, such as the wireless communication standards known from the group of IEEE 802.11 standards. Accordingly, the signal may be a signal according to the Bluetooth and/or according to the Bluetooth Low Energy communication standard, or according to the IEEE 802.11 standard (or one of its variants). For example, the wireless communication device may be a computing device, such as a computer, a desktop computer, a laptop computer, a smartphone or a tablet, a wearable device, such as a smartwatch, a fitness tracker, a heart-rate monitor or a blood oxygenation monitor, a medical device, a sensor device, or an object tracker.

The apparatus comprises the interface circuitry, which is used to obtain the information on the signal received by the wireless communication device. For example, the processing circuitry may be configured to obtain the information on the signal via the interface circuitry. For example, the information on the signal may comprise the signal, e.g. a quantized version of the signal, an excerpt of the signal, e.g. a quantized version of an excerpt of the signal comprising a portion of the signal that is indicative of a wireless identifier contained in wireless transmissions, or a digital representation of the portion of the signal that is indicative of a wireless identifier. The processing circuitry may use the information on the signal to determine the presence of the wireless identifier within the signal, e.g. without having access to the "actual" signal. For example, the wireless identifier may be a Bluetooth access address code (AAC) of the wireless communication device. In the following, the term "Golden AAC" may be used for the "correct" wireless identifier of the wireless communication device.

The processing circuitry then uses the at least one probabilistic detector to determine the presence of the wireless identifier of the wireless communication device within the signal. In this context, a "detector" may be a logical construct, which may be implemented in software, e.g. as a program being executed by a programmable hardware, or in hardware, e.g. as a fixed-function logical block. Accordingly, the detector may correspond to a set of instructions that is used to evaluate the information on the signal. In general, the proposed concept is aimed at reducing an impact of the detection of nearly identical wireless identifiers, e.g. a wireless identifiers that have a Hamming distance of 1 to the wireless identifier of the wireless communication device (a given wireless identifier having a Hamming distance of 1 to the wireless identifier of the wireless communication device if exactly one bit is different between the given wireless identifier and the wireless identifier of the wireless communication device), on the performance of the detector. Consequently, the at least one probabilistic detector may be used to distinguish between these nearly identical and the "correct" wireless identifiers. This may be achieved by determining a likelihood that a wireless identifier contained in the signal is a wireless identifier having a Hamming distance of 1 to the "correct" wireless identifier of the wireless communication device. For example, the processing circuitry may be configured to determine 122 a likelihood of a presence of a wireless identifier having a Hamming distance of 1 from the wireless identifier of the wireless communication device using the at least one probabilistic detector, and to determine the presence of the wireless identifier of the wireless communication device within the signal based on the likelihood of the presence of a wireless identifier having a Hamming distance of 1 from the wireless identifier of the wireless communication device. For example, the processing circuitry may be configured to distinguish 124 between the presence of the wireless identifier of the wireless communication device and the presence of the wireless identifier having a Hamming distance of 1 from the wireless identifier of the wireless communication device using the at least one probabilistic detector. The presence of the wireless identifier of the wireless communication device may be determined after distinguishing between the presence of the wireless identifier of the wireless communication device and the presence of the wireless identifier having a Hamming distance of 1 from the wireless identifier of the wireless communication device.

In various examples of the present disclosure, an approach with two separate probabilistic decoders is chosen—a first one that is used to distinguish whether the signal contains the wireless identifier of the wireless communication device or a wireless identifier that is nearly identical to the wireless identifier of the wireless communication device, e.g. a wireless identifier that has a Hamming distance of 1 to the wireless identifier of the wireless communication device, and a second one that is suitable for detecting whether the signal contains the wireless identifier at all, or whether the signal contains (only) noise. For example, the processing circuitry may be configured to determine 122 the likelihood of a presence of a wireless identifier having a Hamming distance of 1 from the wireless identifier of the wireless communication device using a first probabilistic detector, and to determine 126 a likelihood of the presence of the wireless identifier of the wireless communication device within the signal using a separate second probabilistic detector. The first probabilistic detector is suitable for rejecting the "Hamming Distance One (HDO)" wireless identifiers, which is named HDO Likelihood Ratio Test (LRT), and the second probabilistic detector is suitable for rejecting "Noise Sequences (NS)", which is named NS Generalized Likelihood Ratio Test (GLRT). The proposed detector may thus be a combination of two detectors, which are, in the following denoted HDO_LRT (first probabilistic detector) and NS_GLRT (second probabilistic detector). For example, the processing circuitry may be configured to determine the presence of the wireless identifier of the wireless communication device within the signal if the result of the first probabilistic detector indicates an absence of a wireless identifier having a Hamming distance of 1 from the wireless identifier of the wireless communication device and if the result of the second probabilistic detector indicates the presence of the wireless identifier of the wireless communication device within the signal. By using a combination of two detectors, the apparatus and the wireless communication device may be operated at the sensitivity point without degradation in performance, while passing certification requirements used for certifying the wireless communication device, without the device being aware in advance to the test it should pass (i.e. detection of the device identifier or rejecting an identifier with a Hamming distance of 1).

In particular, both detectors are probabilistic detectors. Accordingly, the first and second probabilistic detectors are used to determine likelihoods of these conditions being true—the first probabilistic detector determining a likelihood that the signal contains a wireless identifier having a Hamming distance of 1, and the second probabilistic detector determining a likelihood that the signal contains the wireless identifier of the wireless communication device.

For example, if the likelihood determined by the first probabilistic detector is the same or above a first threshold ($Thr_{HDO\_LRT}$) (e.g. if the likelihood, that the signal contains the wireless identifier of the wireless communication device instead of a wireless communication device having a Hamming distance of 1 from the wireless identifier of the wireless communication device is the same of above the first threshold), the first probabilistic detector may yield a "1", and a "0" otherwise.

In general, various types of probabilistic detectors may be used. In particular, various examples of the present disclosure use two types of probabilistic detectors—a likelihood ratio test detector (for the first probabilistic detector) and a generalized likelihood ratio test detector (for the second probabilistic detector). For example, the processing circuitry may be configured to determine the likelihood of the presence of a wireless identifier having a Hamming distance of 1 from the wireless identifier of the wireless communication device using a likelihood ratio test detector. In other words, the first probabilistic detector may provide a result based on a likelihood ratio test.

In various examples, the processing circuitry is configured to determine the presence of a wireless identifier having a Hamming distance of 1 from the wireless identifier of the wireless communication device by comparing a correlation between the received signal and a plurality of difference values between the wireless identifier of the wireless communication device and wireless identifiers having a Hamming distance of 1 to a first threshold. In the following mathematical notation, the following terms are used. $s(a)$ may be a signal corresponding to the wireless identifier of the wireless communication device. $z$ may be a portion of the received signal. $s(b_m)$ may be a signal corresponding to a wireless identifier having a Hamming distance of 1 from the wireless identifier of the wireless communication device, with the bit flip occurring at the m-th position within the wireless identifier. $s(a)-s(b_m)$ may be the difference value for the bit flip occurring at the m-th position. $z^H(s(a)-s(b_m))$ may be the correlation between the received signal and a difference value between the wireless identifier of the wireless communication device and wireless identifiers having a Hamming distance of 1 due to a bit-flip at the m-th position within the wireless identifier. $Thr_{HDO\_LRT}$ may be the first threshold. HDO_LRT may define the first probabilistic detector according to an example:

$$HDO\_LRT = \begin{cases} \text{"1"}, & \min_m \Re\{z^H(s(a)-s(b_m))\} \geq Thr_{HDO\_LRT} \\ \text{"0"}, & o.w. \end{cases}$$

In this case, the likelihood of the presence of a wireless identifier having a Hamming distance of 1 from the wireless identifier of the wireless communication device may be based on the correlation between the received signal and a plurality of difference values between the wireless identifier of the wireless communication device and wireless identifiers having a Hamming distance of 1. For example, the plurality of difference values between the wireless identifier of the wireless communication device and wireless identifiers having a Hamming distance of 1 may be pre-computed difference values. For example, the plurality of difference values may be pre-computed for any wireless identifier having a Hamming distance of 1 from the wireless identifier of the wireless communication device. For example, in Bluetooth, the AAC has 32 positions, so 32 difference values may be pre-computed.

With regards to the second probabilistic detector, the processing circuitry may be configured to determine a likelihood of the presence of the wireless identifier of the wireless communication device within the signal using the at least one probabilistic detector, e.g. using the second probabilistic detector. For example, the processing circuitry may be configured to determine a likelihood of the presence of the wireless identifier of the wireless communication device within the signal, as compared to a signal comprising (only) noise, using the at least one probabilistic detector, e.g. using the second probabilistic detector. For example, the processing circuitry may be configured to determine 126 a likelihood of the presence of the wireless identifier of the wireless communication device within the signal using a generalized likelihood ratio test. In other words, the second probabilistic detector may provide a result based on a generalized likelihood ratio test.

In particular, the generalized likelihood ratio test may be performed using the following parameters. For example, the processing circuitry may be configured to determine the presence of the wireless identifier of the wireless communication device within the signal by comparing a ratio between (a) a combination of a portion of the received signal and a signal corresponding to the wireless identifier of the wireless communication device, and (b) the portion of the received signal to the second threshold ($Thr_{NS\_GLRT}$). In the following mathematical notation, the following terms are used. $s(a)$ may be a signal corresponding to the wireless identifier of the wireless communication device. $z$ may be a portion of the received signal. $Thr_{NS\_GLRT}$ may be the second threshold. For example, the processing circuitry may be configured to the presence of the wireless identifier of the wireless communication device within the signal based on a comparison between $$\frac{|s(a)^H z|^2}{\|z\|^2}$$

and the second threshold ($Thr_{NS\_GLRT}$). NS_GLRT may consequently define the second probabilistic detector according to an example:

$$NS\_GLRT = \begin{cases} \text{``1''}, & \frac{|s(a)^H z|^2}{\|z\|^2} \geq Thr_{NS\_GLRT} \\ \text{``0''}, & o.w. \end{cases}$$

More details on the mathematical basis of the proposed detectors are introduced in the subsequent section of the present disclosure.

If the likelihood determined by the second probabilistic detector is the same or above a second threshold ($Thr_{NS\_GLRT}$) (e.g. if the likelihood, that the signal contains the wireless identifier of the wireless communication device instead of noise is the same or above the second threshold), the second probabilistic detector may yield a "1". Alternatively, the values may be inversed. Eventually, the BLE detector may be given by the AND binary operation of these two detectors decisions (when each detector outputs '1' as a declaration of a detection of the required "golden" AAC and outputs '0' otherwise), with the result of the binary "AND" indicating that the presence of the wireless identifier of the wireless communication device has been detected. For example, the processing circuitry may be configured to combine 128 the results of the first and second probabilistic detectors (e.g. using a binary "AND" operation, or a suitable other binary operation if the values are inversed) to determine the presence of the wireless identifier of the wireless communication device within the signal.

The interface circuitry or means for communicating 12 may correspond to one or more inputs and/or outputs for receiving and/or transmitting information, which may be in digital (bit) values according to a specified code, within a module, between modules or between modules of different entities. For example, the interface circuitry or means for communicating 12 may comprise interface circuitry configured to receive and/or transmit information.

In various examples, the control circuitry or means for processing 14 may be implemented using one or more processing units, one or more processing devices, any means for processing, such as a processor, a computer or a programmable hardware component being operable with accordingly adapted software. In other words, the described function of the control circuitry or means for processing 14 may as well be implemented in software, which is then executed on one or more programmable hardware components. Such hardware components may comprise a general-purpose processor, a Digital Signal Processor (DSP), a micro-controller, etc. For example, the control circuitry/means for processing 14 and/or the interface circuitry/means for communicating 12 may be implemented by a transceiver 420, Physical circuitry 430, Media Access Control circuitry 440 and/or processing circuitry 450 introduced in connection with FIG. 4.

More details and aspects of the wireless communication device and the corresponding apparatus, device, method or computer program are mentioned in connection with the proposed concept or one or more examples described above or below (e.g. FIGS. 2 to 4). The wireless communication device and the corresponding apparatus, device, method or computer program may comprise one or more additional optional features corresponding to one or more aspects of the proposed concept or one or more examples described above or below.

Various examples of the present disclosure provide a detector, based on a theoretical probabilistic approach, which may be aimed at rejecting BLE packets with AAC with Hamming distance of one bit between a given "golden" AAC. In addition, this detector may be configured to reject noise sequences to be detected as the given AAC. Such a detector may pass the BQB test without any degradation in the sensitivity point. Therefore, a BT device which passes the BQB test in the sensitivity point while providing improved or optimal performance (which is known in theory), may use the proposed concept. However, the proposed concept may have a sensitivity toward declaring a false alarm for close to zero signals, i.e. if the signal is close to zero for a long enough period (but not too long). If the period of close to zero signal of the designed signal is long enough, the HDO_LRT detector may declare a detection, but if the period is not too long enough, the NS_GLRT may also declare a detection. However, this behavior does not influence the performance of the detector.

As mentioned above, the proposed approach, according to various examples, provides a detector, based on theoretical probabilistic approach, which provides improved performance for rejecting BLE packets with AAC with Hamming distance of one bit between a given "golden" AAC. In addition, this detector should reject noise sequences to be detected as the given AAC. For example, the detector may be implemented by the wireless communication device, apparatus, device, method or computer program introduced in connection with FIGS. 1*a* to 1*b*.

The detector is developed as a combo of two probabilistic based detectors. The first is suitable for rejecting the "Hamming Distance One (HDO)" AACs, which is named HDO Likelihood Ratio Test (LRT), and the second is good for rejecting "Noise Sequences (NS)", which is named NS Generalized Likelihood Ratio Test (GLRT). The proposed detector may thus be a combination of two detectors, which are, in the following denoted HDO_LRT (which may correspond to the first probabilistic detector shown in connection with FIGS. 1*a* to 1*b*) and NS_GLRT (which may correspond to the second probabilistic detector shown in connection with FIGS. 1*a* to 1*b*). Eventually, the BLE detector may be given by the AND binary operation of these two detectors decisions (when each detector outputs '1' as a declaration of a detection of the required "golden" AAC and outputs '0' otherwise). Mathematically, the detector may be defined by the following formulation:

$$BLE\_Detection = HDO\_LRT \cdot NS\_GLRT$$

For mathematical derivation of the detector, the mathematical model of BT BLE GFSK signals is given in the following. The BT signal, in symbol time index i, is given by the following:

$$y_i = h e^{j2\pi \Delta f i T} e^{j\pi \eta \Sigma_k a_k \int_{-\infty}^{iT} g(t-kT) dt} + n_i$$

where $\eta$ is the modulation index ($\eta=0.5$ in BLE), g(t) is the gaussian pulse shape, T is the symbol time duration (T=1 μsec in BLE1M and T=0.5 μsec in BLE2M), $a_k \in \{-1,1\}$ is the $k^{th}$ binary symbol, $\Delta f$ is the carrier frequency offset (CFO), h is the complex one tap channel and ni is the additive noise at time index i.

The Z-Domain (i.e. the Phase-Domain) signal is given by:

$$z_i = y_i y_{i-1}^* = |h|^2 e^{j2\pi \Delta f T} e^{j\pi \eta \Sigma_k a_k \int_{(i-1)T}^{iT} g(t-kT) dt} + n_i y_{i-1}^* + n_{i-1}^* y_i + n_i n_{i-1}^* \approx C e^{j\pi \eta (\gamma a_{i-1} + a_i + \gamma a_{i+1})} + N_i$$

where C is a complex scalar and $N_i \sim CN(0, \sigma^2)$.

Figure 2:
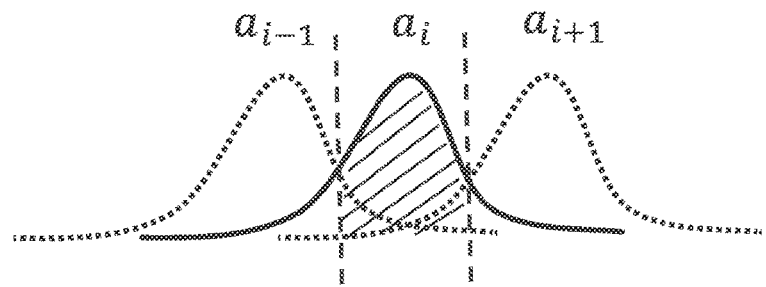
FIG. 2 shows an illustration of a Z-domain phase.

An illustration to the Z-domain phase is in FIG. 2, which shows the phase for $a_{i-1}$, $a_i$, $a_{i+1}$.

Therefore, the waveform samples of the ACC bits in the Z-Domain are given by $$z_i = s_i(a) + N_i, \quad i=1, 2, \ldots, n$$

where $a = [a_1, \ldots, a_n]$ is the AAC bits and n=32 in BLE.

Alternatively, in vector representation $$z = C \cdot s(a) + N$$

where $N \sim CN(0, \sigma^2 I_n)$ and $s(a) = [e^{j\pi\eta(\gamma a_0 + a_1 + \gamma a_2)}, \ldots, e^{j\pi\eta(\gamma a_{n-1} + a_n + \gamma a_{n+1})}]^T$.

Using the above definitions and background, the HDO_LRT and the NS_GLRT detectors are derived mathematically in the following.

In the following, a mathematical introduction into the HDO_LRT—"Hamming Distance of One" Likelihood Ratio Test Detector is given. The one-bit flipped vector in position m may be defined by $b_m$, i.e. $b_m(i) = b_{m,i} = a_i$, $i \neq m$ and $b_m(m) = b_{m,m} = -a_m$.

Therefore, under the assumption of additive Gaussian noise, the likelihood ratio between the reception of the AAC a to any other m=1, 2, ..., n one bit flipped AAC, for a given vector of observations z, is given by the following:

$$HDO_{LRT} = \log \frac{f(z|s(a))}{\frac{1}{2}\sum_{m=1}^{n} f(z|s(b_m))} \propto \log \frac{f(z|s(a))}{\sum_{m=1}^{n} f(z|s(b_m))} =$$

$$\log \frac{e^{-\frac{\|z - Cs(a)\|^2}{\sigma^2}}}{\sum_{m=1}^{n} e^{-\frac{\|z - Cs(b_m)\|^2}{\sigma^2}}} = \log \frac{e^{-\frac{\|z\|^2 - 2\Re\{Cz^H s(a)\} + |C|^2 \|s(a)\|^2}{\sigma^2}}}{\sum_{m=1}^{n} e^{-\frac{\|z\|^2 - 2\Re\{Cz^H s(b_m)\} + |C|^2 \|s(b_m)\|^2}{\sigma^2}}} =$$

$$\log \frac{e^{\frac{2\Re\{Cz^H s(a)\}}{\sigma^2}}}{\sum_{m=1}^{n} e^{\frac{2\Re\{Cz^H s(b_m)\}}{\sigma^2}}} = -\log \sum_{m=1}^{n} e^{\frac{2\Re\{Cz^H (s(b_m) - s(a))\}}{\sigma^2}}$$

Using the "max-log" approximation the following formula is obtained:

$$HDO_{LRT} \approx -\log \max_{m} e^{\frac{2\Re\{Cz^H (s(bm) - s(a))\}}{\sigma^2}} =$$

$$\frac{2|C|}{\sigma^2} \min_{m} \Re\left\{e^{\measuredangle C} z^H (s(a) - s(b_m))\right\} \propto$$

$$\min_{m} \Re\left\{e^{\measuredangle C} z^H (s(a) - s(b_m))\right\} \geq Thr_{HDO\_LRT} \rightarrow \text{Detection}$$

By using the relation between s(a) and $s(b_m)$, the complexity of the detector can be simplified as follows:

$$z^H(s(a) - s(bm)) = z^*_{m-1}(s_{m-1}(a) - s_{m-1}(b_m)) +$$

$$z^*_m(s_m(a) - s_m(b_m)) + z^*_{m+1}(s_{m+1}(a) - s_{m+1}(b_m)) = \sum_{l=m-1}^{m+1} z^*_l \Delta_l(b_m)$$

where $\Delta_l(b_m), l=m-1, n, m+1$ are pre-defined calculations which are given by the following:

$$\Delta_{m-1}(b_m) = s_{m-1}(a) - s_{m-1}(b_m) =$$
$$e^{j\pi\eta(\gamma a_{m-2} + a_{m-1} + \gamma a_m)} - e^{j\pi\eta(\gamma a_{m-2} + a_{m-1} - \gamma a_m)}$$

$$\Delta_m(b_m) = s_m(a) - s_m(b_m) = e^{j\pi\eta(\gamma a_{m-1} + a_m + \gamma a_{m+1})}$$
$$- e^{j\pi\eta(\gamma a_{m-1} + a_m - \gamma a_{m+1})}$$

$$\Delta_{m+1}(b_m) = s_{m+1}(a) - s_{m+1}(b_m) = e^{j\pi\eta(\gamma a_m + a_{m+1} + \gamma a_{m+2})}$$
$$- e^{j\pi\eta(-\gamma a_m + a_{m+1} + \gamma a_{m+2})}$$

This way the correlation $z^H(s(a) - s(bm))$, which in a straight-forward calculation may require n complex multiplications, may be reduced into only three complex multiplications.

To summarize the HDO_LRT detector, its decision rule is given by the following:

$$HDO\_LRT = \begin{cases} "1", & \min_{m} \Re\{z^H(s(a) - s(b_m))\} \geq Thr_{HDO\_LRT} \\ "0", & o.w. \end{cases}$$

In the following, a mathematical introduction into the NS_GLRT—"Noise Sequences" Generalized Likelihood Ratio Test is given. In order to detect between the following two hypotheses:

$H_0: z = N \sim CN(0, \sigma^2 I_n)$, i.e. there is no transmitted signal and only noise is observed.

$H_1: z = C \cdot s(a) + N \sim CN(C \cdot s(a), \sigma^2 I_n)$, i.e. the transmitted ACC is observed.

$$NS_{GLRT} = \log \frac{\max_{C, \sigma^2} f(z|H_1, C, \sigma^2)}{\max_{\sigma^2} f(z|H_0, \sigma^2)} = \log \frac{f(z|H_1, \hat{C}_{ML}, \hat{\sigma}^2_{ML})}{f(z|H_0, \hat{\sigma}^2_{ML})}$$

where the probability densities of $H_0$ and $H_1$, conditioned on the unknown parameters C and $\sigma^2$, are given by the following:

$$f(z|H_1, C, \sigma^2) = \frac{1}{(\pi\sigma^2)^n} e^{-\frac{\|z - C \cdot s(a)\|^2}{\sigma^2}}$$

$$f(z|H_0, \sigma^2) = \frac{1}{(\pi\sigma^2)^n} e^{-\frac{\|z\|^2}{\sigma^2}}$$

Since C and $\sigma^2$ are unknown, they may be estimated using the Maximum Likelihood (ML) technique under the assumption of $H_1$:

$$(\hat{C}_{ML}, \hat{\sigma}^2_{ML}) =$$

$$\operatorname*{argmax}_{C,\sigma^2} f(z|H_1, C, \sigma^2) = \operatorname*{argmax}_{C,\sigma^2} -n\log\pi\sigma^2 - \frac{\|z - C \cdot s(a)\|^2}{\sigma^2} =$$

$$\operatorname*{argmax}_{\sigma^2} \left(-n\log\pi\sigma^2 - \frac{\|z - \hat{C}_{ML} \cdot s(a)\|^2}{\sigma^2}\right)$$

where $$\hat{C}_{ML} = \operatorname*{argmax}_{C} \left(-n\log\pi\sigma^2 - \frac{\|z - C \cdot s(a)\|^2}{\sigma^2}\right) =$$

$$\operatorname*{argmin}_{C} (\|z - C \cdot s(a)\|^2) = \hat{C}_{ZF} == (s(a)^H s(a))^{-1} s(a)^H z = \frac{1}{n} s(a)^H z$$

and $\hat{\sigma}_{ML}^2$ is given by the following $$\hat{\sigma}_{ML}^2 = \underset{\sigma^2}{\mathrm{argmax}}\left(-n\log\pi\sigma^2 - \frac{\|z - \hat{C}_{ML} \cdot s(a)\|^2}{\sigma^2}\right)$$

Zeroing the differentiation of the above argument w.r.t $\sigma^2$ yields the following equation:

$$-\frac{n}{\hat{\sigma}_{ML}^2} + \frac{\|z - \hat{C}_{ML} \cdot s(a)\|^2}{\sigma^2} = 0$$

$$\hat{\sigma}_{ML}^2 = \frac{\|z - \hat{C}_{ML} \cdot s(a)\|^2}{n}$$

In the same way, $\hat{\sigma}_{ML}^2$, under the hypothesis $H_0$ is given by the following $$\hat{\sigma}_{ML}^2 = \underset{\sigma^2}{\mathrm{argmax}} f(z \mid H_0, \sigma^2) = \underset{\sigma^2}{\mathrm{argmax}}\left(-n\log\pi\sigma^2 - \frac{\|z\|^2}{\sigma^2}\right) = \frac{\|z\|^2}{n}$$

Combining all the above yields $$\mathrm{NS\_GLRT} = \log\frac{f(z \mid H_1, \hat{C}_{ML}, \hat{\sigma}_{ML}^2(H_1))}{f(z \mid H_0, \hat{\sigma}_{ML}^2(H_0))} =$$

$$\log\left(\frac{\hat{\sigma}_{ML}^2(H_0)}{\hat{\sigma}_{ML}^2(H_1)}\right)^n = n\log\frac{\hat{\sigma}_{ML}^2(H_0)}{\hat{\sigma}_{ML}^2(H_1)} = n\log\frac{\|z\|^2}{\|z - \hat{C}_{ML} \cdot s(a)\|^2} =$$

$$n\log\frac{\|z\|^2}{\|z\|^2 - 2\Re\{z^H \hat{C}_{ML}s(a)\} + |\hat{C}_{ML}|^2 s(a)^2} =$$

$$n\log\frac{\|z\|^2}{\|z\|^2 - 2\Re\{n\hat{C}_{ML}^* \hat{C}_{ML}\} + n|\hat{C}_{ML}|^2} = n\log$$

$$\frac{\|z\|^2}{\|z\|^2 - n|\hat{C}_{ML}|^2} = \propto \frac{|s(a)^H z|^2}{\|z\|^2} \geq Thr_{NS\_GLRT} \rightarrow \text{Detection}$$

To summarize the NS_GLRT detector, its decision rule is given by the following:

$$\mathrm{NS\_GLRT} = \begin{cases} \text{``1''}, & \frac{|s(a)^H z|^2}{\|z\|^2} \geq Thr_{NS\_GLRT} \\ \text{``0''}, & \text{o.w.} \end{cases}$$

The combined detector for BLE packets is given by the AND binary operation of the HDO_LRT and NS_GLRT as follows:

BLE_Detection(Thr$_{HDO\_LRT}$,
Thr$_{NS\_GLRT}$)=HDO_LRT
(Thr$_{HDO\_LRT}$)·NS_GLRT(Thr$_{NS\_GLRT}$)

By optimizing Thr$_{HDO\_LRT}$ and Thr$_{NS\_GLRT}$ thresholds, the BLE detector can pass the BQB test and also to have a negligible MD in the sensitivity point which may improve the performance and might even reach the optimal theoretical performance in terms of PER (Packet Error Rate) vs. SNR (Signal-to-Noise-Ratio) for BLE packets.

More details and aspects of the BLE detector are mentioned in connection with the proposed concept or one or more examples described above or below (e.g. FIGS. 1a to 1b, and 3 to 4). The BLE detector may comprise one or more additional optional features corresponding to one or more aspects of the proposed concept or one or more examples described above or below.

Figure 3:
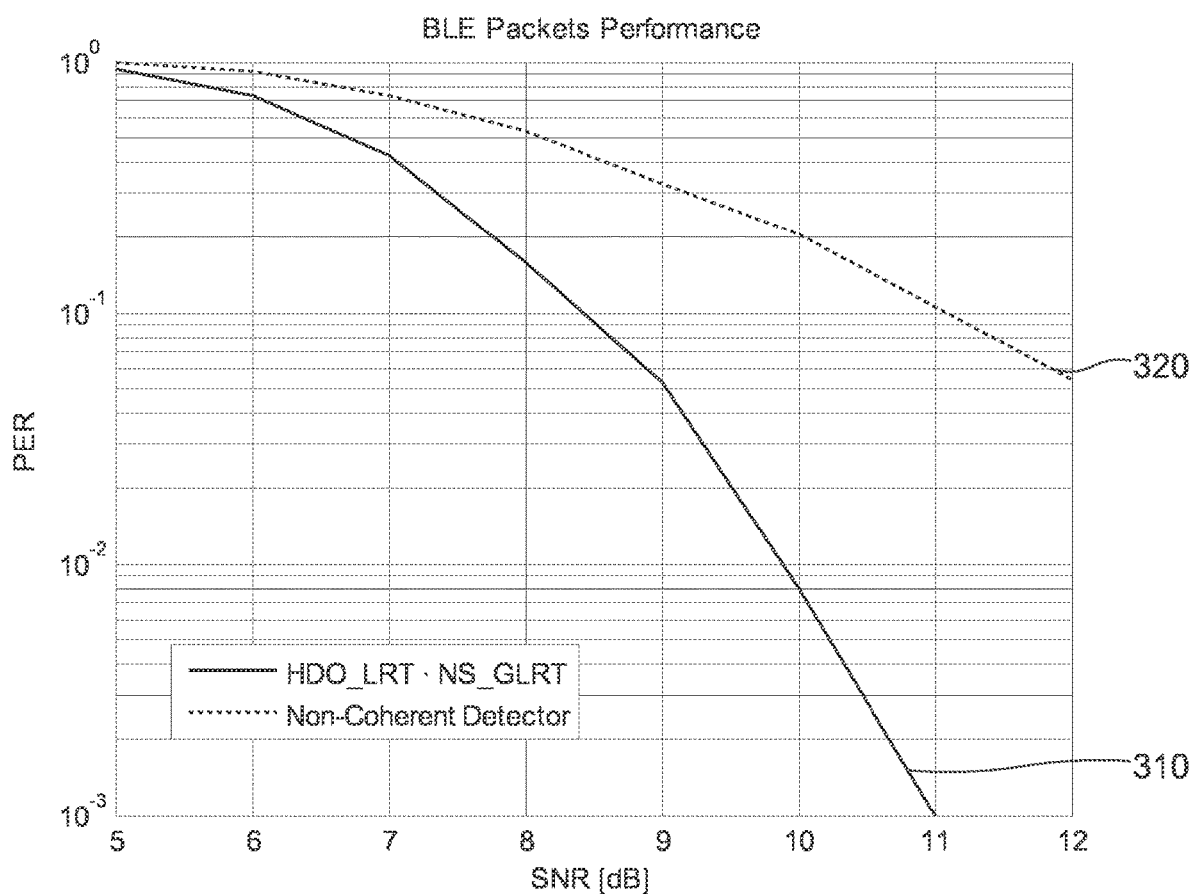
FIG. 3 shows a performance comparison between a proposed Bluetooth Low Energy detector and another BLE detector that is based on a non-coherent demodulation of AAC bits.

In FIG. 3, the performance 310 of the proposed BLE detector is compared with the performance 320 of another BLE detector that is based on a non-coherent demodulation of the AAC bits. The proposed BLE detector (HDO_LRT·NS_GLRT) outperforms the Classical BLE detector (non-coherent demodulation of the 32 AAC bits with a threshold that avoids any bit error in order to pass the BQB test).

More details and aspects of the BLE detector are mentioned in connection with the proposed concept or one or more examples described above or below (e.g. FIGS. 1a to 2, and 4). The BLE detector may comprise one or more additional optional features corresponding to one or more aspects of the proposed concept or one or more examples described above or below.

Figure 4:
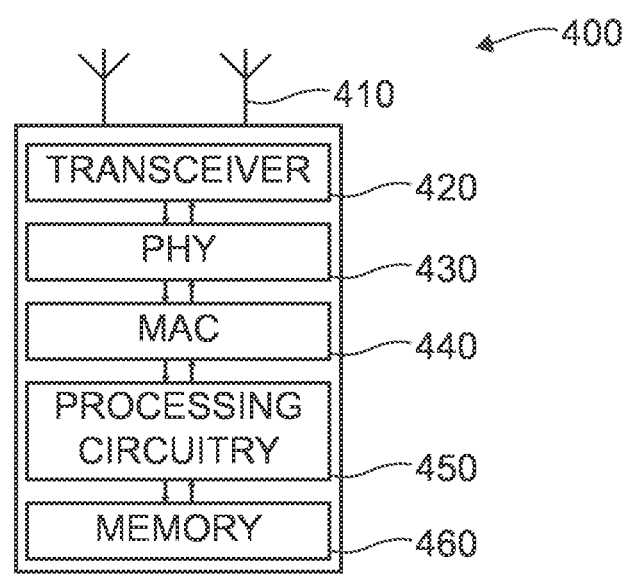
FIG. 4 shows a block diagram of an example of a wireless communication device.

FIG. 4 shows a block diagram of an example of a wireless communication device 400. In accordance with various examples, wireless communication device 400 may include, among other things, a transmit/receive element 410 (for example an antenna), a transceiver 420, physical (PHY) circuitry 430, and media access control (MAC) circuitry 440. The PHY circuitry 430 and MAC circuitry 440 may be compliant with one or more wireless standards such as IEEE 802.11 standards and/or Bluetooth™ (Low Energy). The PHY circuitry 430 may include circuitry for modulation/demodulation, upconversion/downconversion, filtering, amplification, etc. In some examples, the transmit/receive elements 410 may be two or more antennas that may be coupled to the PHY circuitry 430 and arranged for sending and receiving signals.

Wireless communication device 400 may also include processing circuitry 450 and memory 460 configured to perform the various operations described herein. The circuitry 450 may be configured to perform functions based on instructions being stored in a RAM or ROM, or based on special purpose circuitry. The circuitry 450 may include one or more processors, such as a general-purpose processor or special purpose processor, and/or processing circuitry in accordance with some examples. The circuitry 450 may implement one or more functions associated with the transceiver 420, the PHY circuitry 430, the MAC circuitry 440, and/or the memory 460. The circuitry 450 may be coupled to the transceiver 420, which may be coupled to the transmit/receive element 410. While FIG. 4 depicts the circuitry 450 and the transceiver 420 as separate components, the circuitry 450 and the transceiver 420 may be integrated together in an electronic package or chip.

In some examples, a wireless communication device 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as Bluetooth or IEEE 802.11, or other device that may receive and/or transmit information wirelessly. In some examples, the wireless communication device may include one or more of a keyboard, a display, anon-volatile memory port, multiple antennas, a graphics processor, an application processor, speakers, and other mobile device elements. The display may be an LCD screen including a touch screen.

Although the Wireless communication device 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some examples, the functional elements may refer to one or more processes operating on one or more processing elements.

Some examples may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 400 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

More details and aspects of the wireless communication device are mentioned in connection with the proposed concept or one or more examples described above or below (e.g. FIGS. 1a to 3). The wireless communication device may comprise one or more additional optional features corresponding to one or more aspects of the proposed concept or one or more examples described above or below.

The aspects and features described in relation to a particular one of the previous examples may also be combined with one or more of the further examples to replace an identical or similar feature of that further example or to additionally introduce the features into the further example.

Example 1 relates to an apparatus (10) for a wireless communication device (100; 400). The apparatus (10) comprises 400), the apparatus comprising interface circuitry (12) for obtaining information on a signal received by the wireless communication device. The apparatus (10) comprises processing circuitry (14) configured to determine a presence of a wireless identifier of the wireless communication device within the signal using at least one probabilistic detector.

In Example 2, the subject matter of example 1 or any of the Examples described herein may further include, that the processing circuitry is configured to determine a likelihood of a presence of a wireless identifier having a Hamming distance of 1 from the wireless identifier of the wireless communication device using the at least one probabilistic detector, and to determine the presence of the wireless identifier of the wireless communication device within the signal based on the likelihood of the presence of a wireless identifier having a Hamming distance of 1 from the wireless identifier of the wireless communication device.

In Example 3, the subject matter of example 2 or any of the Examples described herein may further include, that the processing circuitry is configured to distinguish between the presence of the wireless identifier of the wireless communication device and the presence of the wireless identifier having a Hamming distance of 1 from the wireless identifier of the wireless communication device using the at least one probabilistic detector.

In Example 4, the subject matter of example 3 or any of the Examples described herein may further include, that the processing circuitry is configured to determine the likelihood of a presence of a wireless identifier having a Hamming distance of 1 from the wireless identifier of the wireless communication device using a first probabilistic detector, and to determine a likelihood of the presence of the wireless identifier of the wireless communication device within the signal using a separate second probabilistic detector.

In Example 5, the subject matter of example 4 or any of the Examples described herein may further include, that the processing circuitry is configured to combine results of the first and second probabilistic detectors to determine the presence of the wireless identifier of the wireless communication device within the signal.

In Example 6, the subject matter of example 5 or any of the Examples described herein may further include, that the processing circuitry is configured to determine the presence of the wireless identifier of the wireless communication device within the signal if the result of the first probabilistic detector indicates an absence of a wireless identifier having a Hamming distance of 1 from the wireless identifier of the wireless communication device and if the result of the second probabilistic detector indicates the presence of the wireless identifier of the wireless communication device within the signal.

In Example 7, the subject matter of one of the examples 2 to 6 or any of the Examples described herein may further include, that the processing circuitry is configured to determine the likelihood of the presence of a wireless identifier having a Hamming distance of 1 from the wireless identifier of the wireless communication device using a likelihood ratio test detector.

In Example 8, the subject matter of one of the examples 2 to 7 or any of the Examples described herein may further include, that the processing circuitry is configured to determine the presence of a wireless identifier having a Hamming distance of 1 from the wireless identifier of the wireless communication device by comparing a correlation between the received signal and a plurality of difference values between the wireless identifier of the wireless communication device and wireless identifiers having a Hamming distance of 1 to a first threshold.

In Example 9, the subject matter of example 8 or any of the Examples described herein may further include, that the plurality of difference values between the wireless identifier of the wireless communication device and wireless identifiers having a Hamming distance of 1 are pre-computed difference values.

In Example 10, the subject matter of one of the examples 1 to 9 or any of the Examples described herein may further include, that the processing circuitry is configured to determine a likelihood of the presence of the wireless identifier of the wireless communication device within the signal using the at least one probabilistic detector.

In Example 11, the subject matter of example 10 or any of the Examples described herein may further include, that the processing circuitry is configured to determine a likelihood of the presence of the wireless identifier of the wireless communication device within the signal using a generalized likelihood ratio test.

In Example 12, the subject matter of one of the examples 10 to 11 or any of the Examples described herein may further include, that the processing circuitry is configured to determine the presence of the wireless identifier of the wireless communication device within the signal by comparing a ratio between a combination of a portion of the received signal and a signal corresponding to the wireless identifier of the wireless communication device, and the portion of the received signal, to a second threshold.

In Example 13, the subject matter of example 12 or any of the Examples described herein may further include, that the processing circuitry is configured to the presence of the wireless identifier of the wireless communication device within the signal based on a comparison between $$\frac{|s(a)^H z|^2}{\|z\|^2}$$

and the second threshold, with s(a) being the signal corresponding to the wireless identifier of the wireless communication device and z being the portion of the received signal.

In Example 14, the subject matter of one of the examples 1 to 13 or any of the Examples described herein may further include, that the signal is a signal according to the Bluetooth and/or according to the Bluetooth Low Energy communication standard.

Example 15 relates to a wireless communication device comprising the apparatus according to one of the examples 1 to 14.

Example 16 relates to a device for a wireless communication device (100; 400). The device comprises 400), the device comprising means for communicating (12), suitable for obtaining information on a signal received by the wireless communication device. The device comprises means for processing (14) configured to determine a presence of a wireless identifier of the wireless communication device within the signal using at least one probabilistic detector.

In Example 17, the subject matter of example 16 or any of the Examples described herein may further include, that the means for processing is configured to determine a likelihood of a presence of a wireless identifier having a Hamming distance of 1 from the wireless identifier of the wireless communication device using the at least one probabilistic detector, and to determine the presence of the wireless identifier of the wireless communication device within the signal based on the likelihood of the presence of a wireless identifier having a Hamming distance of 1 from the wireless identifier of the wireless communication device.

In Example 18, the subject matter of example 17 or any of the Examples described herein may further include, that the means for processing is configured to distinguish between the presence of the wireless identifier of the wireless communication device and the presence of the wireless identifier having a Hamming distance of 1 from the wireless identifier of the wireless communication device using the at least one probabilistic detector.

In Example 19, the subject matter of example 18 or any of the Examples described herein may further include, that the means for processing is configured to determine the likelihood of a presence of a wireless identifier having a Hamming distance of 1 from the wireless identifier of the wireless communication device using a first probabilistic detector, and to determine a likelihood of the presence of the wireless identifier of the wireless communication device within the signal using a separate second probabilistic detector.

In Example 20, the subject matter of example 19 or any of the Examples described herein may further include, that the means for processing is configured to combine results of the first and second probabilistic detectors to determine the presence of the wireless identifier of the wireless communication device within the signal.

In Example 21, the subject matter of example 20 or any of the Examples described herein may further include, that the means for processing is configured to determine the presence of the wireless identifier of the wireless communication device within the signal if the result of the first probabilistic detector indicates an absence of a wireless identifier having a Hamming distance of 1 from the wireless identifier of the wireless communication device and if the result of the second probabilistic detector indicates the presence of the wireless identifier of the wireless communication device within the signal.

In Example 22, the subject matter of one of the examples 17 to 21 or any of the Examples described herein may further include, that the means for processing is configured to determine the likelihood of the presence of a wireless identifier having a Hamming distance of 1 from the wireless identifier of the wireless communication device using a likelihood ratio test detector.

In Example 23, the subject matter of one of the examples 17 to 22 or any of the Examples described herein may further include, that the means for processing is configured to determine the presence of a wireless identifier having a Hamming distance of 1 from the wireless identifier of the wireless communication device by comparing a correlation between the received signal and a plurality of difference values between the wireless identifier of the wireless communication device and wireless identifiers having a Hamming distance of 1 to a first threshold.

In Example 24, the subject matter of example 23 or any of the Examples described herein may further include, that the plurality of difference values between the wireless identifier of the wireless communication device and wireless identifiers having a Hamming distance of 1 are pre-computed difference values.

In Example 25, the subject matter of one of the examples 16 to 24 or any of the Examples described herein may further include, that the means for processing is configured to determine a likelihood of the presence of the wireless identifier of the wireless communication device within the signal using the at least one probabilistic detector.

In Example 26, the subject matter of example 25 or any of the Examples described herein may further include, that the means for processing is configured to determine a likelihood of the presence of the wireless identifier of the wireless communication device within the signal using a generalized likelihood ratio test.

In Example 27, the subject matter of one of the examples 25 to 26 or any of the Examples described herein may further include, that the means for processing is configured to determine the presence of the wireless identifier of the wireless communication device within the signal by comparing a ratio between a combination of a portion of the received signal and a signal corresponding to the wireless identifier of the wireless communication device, and the portion of the received signal to a second threshold.

In Example 28, the subject matter of example 27 or any of the Examples described herein may further include, that the means for processing is configured to the presence of the wireless identifier of the wireless communication device within the signal based on a comparison between $$\frac{|s(a)^H z|^2}{\|z\|^2}$$

and the second threshold, with s(a) being the signal corresponding to the wireless identifier of the wireless communication device and z being the portion of the received signal.

In Example 29, the subject matter of one of the examples 16 to 28 or any of the Examples described herein may further include, that the signal is a signal according to the Bluetooth and/or according to the Bluetooth Low Energy communication standard.

Example 30 relates to a wireless communication device comprising the device according to one of the examples 16 to 29.

Example 31 relates to a method for a wireless communication device (100; 400). The method comprises 400), the method comprising obtaining (110) information on a signal received by the wireless communication device. The method comprises determining (120) a presence of a wireless identifier of the wireless communication device within the signal using at least one probabilistic detector.

In Example 32, the subject matter of example 31 or any of the Examples described herein may further include, that the method comprises determining (122) a likelihood of a presence of a wireless identifier having a Hamming distance of 1 from the wireless identifier of the wireless communication device using the at least one probabilistic detector, and determining (120) the presence of the wireless identifier of the wireless communication device within the signal based on the likelihood of the presence of a wireless identifier having a Hamming distance of 1 from the wireless identifier of the wireless communication device.

In Example 33, the subject matter of example 32 or any of the Examples described herein may further include, that the method comprises distinguishing (124) between the presence of the wireless identifier of the wireless communication device and the presence of the wireless identifier having a Hamming distance of 1 from the wireless identifier of the wireless communication device using the at least one probabilistic detector.

In Example 34, the subject matter of example 33 or any of the Examples described herein may further include, that the method comprises determining (122) the likelihood of a presence of a wireless identifier having a Hamming distance of 1 from the wireless identifier of the wireless communication device using a first probabilistic detector, and determining (126) a likelihood of the presence of the wireless identifier of the wireless communication device within the signal using a separate second probabilistic detector.

In Example 35, the subject matter of example 34 or any of the Examples described herein may further include, that the method comprises combining (128) results of the first and second probabilistic detectors to determine the presence of the wireless identifier of the wireless communication device within the signal.

In Example 36, the subject matter of example 35 or any of the Examples described herein may further include, that the method comprises determining (120) the presence of the wireless identifier of the wireless communication device within the signal if the result of the first probabilistic detector indicates an absence of a wireless identifier having a Hamming distance of 1 from the wireless identifier of the wireless communication device and if the result of the second probabilistic detector indicates the presence of the wireless identifier of the wireless communication device within the signal.

In Example 37, the subject matter of one of the examples 32 to 36 or any of the Examples described herein may further include, that the method comprises determining (122) the likelihood of the presence of a wireless identifier having a Hamming distance of 1 from the wireless identifier of the wireless communication device using a likelihood ratio test detector.

In Example 38, the subject matter of one of the examples 32 to 37 or any of the Examples described herein may further include, that the method comprises determining the presence of a wireless identifier having a Hamming distance of 1 from the wireless identifier of the wireless communication device by comparing a correlation between the received signal and a plurality of difference values between the wireless identifier of the wireless communication device and wireless identifiers having a Hamming distance of 1 to a first threshold.

In Example 39, the subject matter of example 38 or any of the Examples described herein may further include, that the plurality of difference values between the wireless identifier of the wireless communication device and wireless identifiers having a Hamming distance of 1 are pre-computed difference values.

In Example 40, the subject matter of one of the examples 31 to 39 or any of the Examples described herein may further include, that the method comprises determining (126) a likelihood of the presence of the wireless identifier of the wireless communication device within the signal using the at least one probabilistic detector.

In Example 41, the subject matter of example 40 or any of the Examples described herein may further include, that the method comprises determining a likelihood of the presence of the wireless identifier of the wireless communication device within the signal using a generalized likelihood ratio test.

In Example 42, the subject matter of one of the examples 40 to 41 or any of the Examples described herein may further include, that the method comprises determining the presence of the wireless identifier of the wireless communication device within the signal by comparing a ratio between a combination of a portion of the received signal and a signal corresponding to the wireless identifier of the wireless communication device, and the portion of the received signal to a second threshold.

In Example 43, the subject matter of example 42 or any of the Examples described herein may further include, that the method comprises determining the presence of the wireless identifier of the wireless communication device within the signal based on a comparison between $$\frac{|s(a)^H z|^2}{\|z\|^2}$$

and the second threshold, with s(a) being the signal corresponding to the wireless identifier of the wireless communication device and z being the portion of the received signal.

In Example 44, the subject matter of one of the examples 31 to 43 or any of the Examples described herein may further include, that the signal is a signal according to the Bluetooth and/or according to the Bluetooth Low Energy communication standard.

Example 45 relates to a wireless communication device being configured to perform the method according to one of the examples 31 to 44.

Example 46 relates to a machine-readable storage medium including program code, when executed, to cause a machine to perform the method of one of the examples 31 to 45.

Example 47 relates to a computer program having a program code for performing the method of one of the examples 31 to 45, when the computer program is executed on a computer, a processor, or a programmable hardware component.

Example 48 relates to a machine-readable storage including machine readable instructions, when executed, to implement a method or realize an apparatus as shown in any Example or claimed in any pending claim.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. An apparatus for a wireless communication device, the apparatus comprising:
   a transceiver configured to receive a signal carrying a packet; and
   processing circuitry configured to:
      determine a presence of a wireless identifier of the wireless communication device within the signal using at least one probabilistic detector and reject the packet if the wireless identifier of the wireless communication device is not present within the signal,
   wherein the processing circuitry is configured to determine a likelihood of a presence of a wireless identifier having a Hamming distance of 1 from the wireless identifier of the wireless communication device using the at least one probabilistic detector, and to determine the presence of the wireless identifier of the wireless communication device within the signal based on the likelihood of the presence of a wireless identifier having a Hamming distance of 1 from the wireless identifier of the wireless communication device.

2. The apparatus according to claim 1, wherein the processing circuitry is configured to distinguish between the presence of the wireless identifier of the wireless communication device and the presence of the wireless identifier having a Hamming distance of 1 from the wireless identifier of the wireless communication device using the at least one probabilistic detector.

3. The apparatus according to claim 2, wherein the processing circuitry is configured to:
   determine the likelihood of a presence of a wireless identifier having a Hamming distance of 1 from the wireless identifier of the wireless communication device using a first probabilistic detector; and
   determine a likelihood of the presence of the wireless identifier of the wireless communication device within the signal using a separate second probabilistic detector.

4. The apparatus according to claim 3, wherein the processing circuitry is configured to combine results of the first and second probabilistic detectors to determine the presence of the wireless identifier of the wireless communication device within the signal.

5. The apparatus according to claim 4, wherein the processing circuitry is configured to determine the presence of the wireless identifier of the wireless communication device within the signal if:
   the result of the first probabilistic detector indicates an absence of a wireless identifier having a Hamming distance of 1 from the wireless identifier of the wireless communication device; and
   the result of the second probabilistic detector indicates the presence of the wireless identifier of the wireless communication device within the signal.

6. The apparatus according to claim 1, wherein the processing circuitry is configured to determine the likelihood of the presence of a wireless identifier having a Hamming distance of 1 from the wireless identifier of the wireless communication device using a likelihood ratio test detector.

7. The apparatus according to claim 1, wherein the processing circuitry is configured to determine the presence of a wireless identifier having a Hamming distance of 1 from the wireless identifier of the wireless communication device by comparing a correlation between the received signal and a plurality of difference values between the wireless identifier of the wireless communication device and wireless identifiers having a Hamming distance of 1 to a first threshold.

8. The apparatus according to claim 7, wherein the plurality of difference values between the wireless identifier of the wireless communication device and wireless identifiers having a Hamming distance of 1 are pre-computed difference values.

9. The apparatus according to claim 1, wherein the processing circuitry is configured to determine a likelihood of the presence of the wireless identifier of the wireless communication device within the signal using the at least one probabilistic detector.

10. The apparatus according to claim 9, wherein the processing circuitry is configured to determine a likelihood of the presence of the wireless identifier of the wireless communication device within the signal using a generalized likelihood ratio test.

11. The apparatus according to claim 9, wherein the processing circuitry is configured to determine the presence of the wireless identifier of the wireless communication device within the signal by comparing a ratio between a combination of a portion of the received signal and a signal corresponding to the wireless identifier of the wireless communication device, and the portion of the received signal, to a second threshold.

12. The apparatus according to claim 11, wherein the processing circuitry is configured to determine the presence of the wireless identifier of the wireless communication device within the signal based on a comparison between $$\frac{|s(a)^H z|^2}{\|z\|^2}$$

and the second threshold, with s(a) being the signal corresponding to the wireless identifier of the wireless communication device and z being the portion of the received signal.

13. The apparatus according to claim 1, wherein the signal is a signal according to the Bluetooth and/or according to the Bluetooth Low Energy communication standard.

14. A wireless communication device comprising the apparatus according to claim 1.

15. A method for a wireless communication device, the method comprising:
receiving a signal carrying a packet;
determining a likelihood of a presence of a wireless identifier having a Hamming distance of 1 from a wireless identifier of the wireless communication device within the signal using at least one probabilistic detector;
determining a presence of the wireless identifier of the wireless communication device within the signal based on the likelihood of the presence of a wireless identifier having a Hamming distance of 1 from the wireless identifier of the wireless communication device; and
rejecting the packet if the wireless identifier of the wireless communication device is not present within the signal.

16. The method according to claim 15, wherein the method comprises distinguishing between the presence of the wireless identifier of the wireless communication device and the presence of the wireless identifier having a Hamming distance of 1 from the wireless identifier of the wireless communication device using the at least one probabilistic detector.

17. The method according to claim 15, wherein the method comprises:
determining the likelihood of a presence of a wireless identifier having a Hamming distance of 1 from the wireless identifier of the wireless communication device using a first probabilistic detector; and
determining a likelihood of the presence of the wireless identifier of the wireless communication device within the signal using a separate second probabilistic detector.

18. A non-transitory, computer-readable medium comprising a program code that, when the program code is executed on a computer, a processor, or a programmable hardware component, performs the method of claim 15.

* * * * *